United States Patent [19]
Saito

[11] 4,185,503
[45] * Jan. 29, 1980

[54] VIBRATION DETECTOR

[75] Inventor: Makoto Saito, Tokyo, Japan

[73] Assignee: Oki Electric Industry Co., Ltd., Tokyo, Japan

[*] Notice: The portion of the term of this patent subsequent to May 8, 1996, has been disclaimed.

[21] Appl. No.: 903,063

[22] Filed: May 5, 1978

[30] Foreign Application Priority Data

May 9, 1977 [JP] Japan ................... 52-52127

[51] Int. Cl.² ............................................. G01N 29/00
[52] U.S. Cl. ...................................................... 73/653
[58] Field of Search ...................... 73/653, 655, 517 R; 340/17 R, 689, 669, 683, 566; 250/231 R

[56] References Cited
U.S. PATENT DOCUMENTS

| 3,789,674 | 2/1974 | Anderson et al. | 73/517 R |
| 3,961,185 | 6/1976 | Brokenshire et al. | 73/517 R |

Primary Examiner—Anthony V. Ciarlante
Attorney, Agent, or Firm—Armstrong, Nikaido, Marmelstein & Kubovcik

[57] ABSTRACT

A vibration detector having a mass pivotally mounted in a housing, means for sensing the vibration of the mass and means for damping the vibration of the mass has been found. The sensing of the vibration of the mass is performed through a combination of an optical and electrical means. The mass has a mirror, and an optical path from a fixed light source to a fixed light receiving plane through the mirror on the mass is provided. A beam sensor mounted at the light receiving plane, said beam sensor having a plurality of cells, senses the presence of the light beam from the light source through the mirror on each cell. The parallel light beam illuminates the specific cell depending upon the vibration of the mass and the illuminated cell provides an electric output signal indicating the reception of the beam. Thus, the vibration is detected as the electrical output of each cell.

5 Claims, 12 Drawing Figures

VIBRATION DETECTOR

BACKGROUND OF THE INVENTION

The present invention relates to vibration detectors, in particular, it relates to a vibration detector which is capable of detecting the condition that two out of three components of a composite vibration have reached a predetermined value.

The present vibration detector can be utilized as a seismograph for measuring an earthquake. Usually, the vibration of an earthquake has three independent components, however, the analysis of two components in an horizontal plane is enough for determining earthquake damage.

There are various known vibration detectors, some of which are as follows.

(1) Vibration Detector (A)

Two sets of conventional vibrometers which detect only one component are appropriately arranged so that two components may be detected. The electric output from these two sets of vibrometers is delivered to the square root circuit and it is then determined whether the output thus produced has reached the set point.

(2) Vibration Detector (B)

A pendulum which is allowed to vibrate within an approximate plane doubles as a movable electrode. This pendulum in the stationary position is positioned in the centre of a cylindrical ring which is the fixed electrode. As the vibration reaches the predetermined value, the movable electrode makes contact with the fixed electrode, and a circuit is closed to provide an electrical signal.

(3) Vibration Detector (C)

In the vibration detector (B) in place of the movable electrode and the fixed electrode, multiple numbers of electric contacts are provided either on the circumference of the pendulum or on that of the cylindrical fulcrum of the pendulum. As the vibration reaches the set point the circuit is closed at the electric contact points.

The following are detailed descriptions with reference to FIGS. 1 to 3 (B) of the accompanying drawings, of each of the above-mentioned three different prior art vibration detectors used in seismography to detect horizontal components of earthquake motion.

FIG. 1 depicts an example of the first form of detector, (detector A). In FIG. 1, 1a is the vibrometer installed to detect the east-west component of the earthquake motion, 1b is the other vibrometer for detecting the south-north component of the earthquake motion, 3a is a square root circuit, 4a is an amplitude detector, 5a is a relay circuit, 6a is a relay output.

This vibration detector detects the movement of the ground in a horizontal plane. The vibrometer or seismograph converter 1a for detecting the east-west component delivers electrical output corresponding to the amplitude of the east-west vibration of the earthquake motion to the square root circuit 3a. The vibrometer seismograph converter 2a for detecting the south-north component delivers electrical output corresponding to the vibration of the south-north component of the earthquake motion to the square root circuit 3a. The square root circuit 3a computes the square root of the above two inputs, and applies an electric output corresponding to the amplitude of the vibration of the earthquake in the horizontal plane to the amplitude detector 4a. The amplitude detector 4a generates output, when an electrical input exceeds a predetermined value. This output actuates the relay circuit 5a, and the relay contact output 6a provides an output signal. If the relay circuit 5a is a self-hold type, the ablve mentioned output signal is maintained after the vibration stops.

However, this type of device requires two sets of seismograph converters 1a and 1b. Furthermore, electronic circuits of various functions are needed. Therefore, this device is complex and high priced.

FIG. 2 shows the second model (vibrator B). In FIG. 2, the reference numeral 1b is a platform, 2b is a fulcrum, 3b is a pendulum, 4b is a movable electrode, 5b is a fixed electrode, 6b is an insulation seat, 7b and 8b are cables, 9b is a relay circuit, 10b is a relay output.

The platform 1b is positioned horizontally. The movable electrode 4b attached to the pendulum 3b is placed in the center of the fixed electrode 5b in the stationary condition. If there is a vibration, the relative position of the pendulum 3b and the platform 1b changes. The pendulum 3b is supported by the fulcrum 2b so that it may move freely in all directions within a horizontal plane. Therefore, provided the magnitude of the earthquake motion is limited within the amplitude of the inner diameter of the fixed electrode, the movable electrode 4b will come into contact with some part of the interior wall of the fixed electrode 5b.

Since the fixed electrode 5b and the movable electrode 4b are connected with the relay circuit 9b by the cables 7b and 8b, the relay circuit 9b is actuated by the contact of the movable electrode 4b and fixed electrode 5b, and the relay output 10b indicates that the movable electrode 4b contacts with the fixed electrode 5b. The fact that the earthquake motion has reached the set point is detected in this manner.

Although this device is of simple configuration, the size of the fixed electrode 5b determines the set point and no modification of the set point can be made.

FIG. 3(A) and FIG. 3(B) explain the model 3 (detector C). In those FIGS., 1c is a housing, 2c is a pendulum, 3c are contacts, 4c is a set point adjustable screw, 5c is a relay circuit, 6c is a relay output.

The housing 1c is positioned horizontally. The pendulum 2c is standing upright in a stationary condition. The multiple contacts 3c provided on the circumference of the upper part of the pendulum 2c are directly confronting the set point adjustment screws 4c. The distance between these contacts 3c and their respective set point adjustment screws 4c is identical throughout. The set point adjustment screws 4c may be adjusted so that the contact 3c will make a circuit precisely at a point where the value of horizontal motion is to be detected. When the earthquake motion reaches the set point, any one of the multiple contacts 3c makes a circuit, whereby the relay circuit 5c is actuated. Then the relay output 6c becomes inverted from its stationary condition. That the earthquake motion has reached the set point may be detected in this manner.

This device has an advantage in that its set point can be altered by its set point adjustment screw 4c. However, this means that a very careful adjustment of the multiple numbers of the set point adjustment screws 4c is essential. The numbers of the contacts 3c and the set point adjustment screws 4c determine set point errors. Therefore, if errors are to be reduced, the number of the contacts should be increased resulting in increased adjustment work which is troublesome.

In order to overcome the above disadvantages the present applicant proposed the improved vibration detector in U.S. patent application Ser. No. 841,116. Such a vibration detector comprises a stationary housing, a mass pivotally mounted in the housing so that it can deflect in an oscillatory manner from a vertical datum position upon the application of vibration to the housing and returns to the datum position after dessation of the application of the vibration, a light beam sensor having a plurality of cells mounted on the mass or on the stationary housing, a light source mounted on the stationary housing or on the mass, whichever does not have the sensor mounted on it, optical means for focusing a light beam from the source and causing it to be directed on to one or other of the cells in dependence upon whether or not the mass is deflected, and each cell of said beam sensor being arranged to provide an electrical signal according to the cell that the light beam illuminates depending upon the deflection of the mass.

Although the above vibration detector is satisfactory in operation, there are some points which should be improved. For instance, the structure of the mass is complicated as the mass has an optical and/or electrical means. Since the mass must deflect very smoothly, complicated structure of the mass is a necessary disadvantage. Further, as the light path does not amplify the deflection of the mass, the sensitivity of the above vibration detector is rather low.

SUMMARY OF THE INVENTION

It is an object of the present invention to overcome the disadvantages and limitations of prior vibration detectors by providing a new and improved vibration detector which will detect a vibration of a predetermined intensity or above in any horizontal direction.

Another object of the present invention is to provide a vibration detector in which the structure of the mass is simple and the sensitivity is high.

According to the present invention, the vibration detector comprises a stationary housing, a mass pivotally mounted in the housing so that it can deflect in an oscillalatory manner from a vertical datum position upon the application of vibration to the housing and returns to the datum position after cessation of the application of the vibration, an optical mirror fixed horizontally on the top of the mass, a light source mounted on the stationary housing, a light beam receiving plane optically connected to a plurality of cells mounted on the stationary housing, a first optical means for directing the light beam from the light source on to the mirror, a second optical means for focusing the light beam reflected by the mirror from the light source on to said light beam receiving plane and each of said cell being arranged to provide an electrical signal according to the cell that the light beam illuminates depending upon the deflection of the mass.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
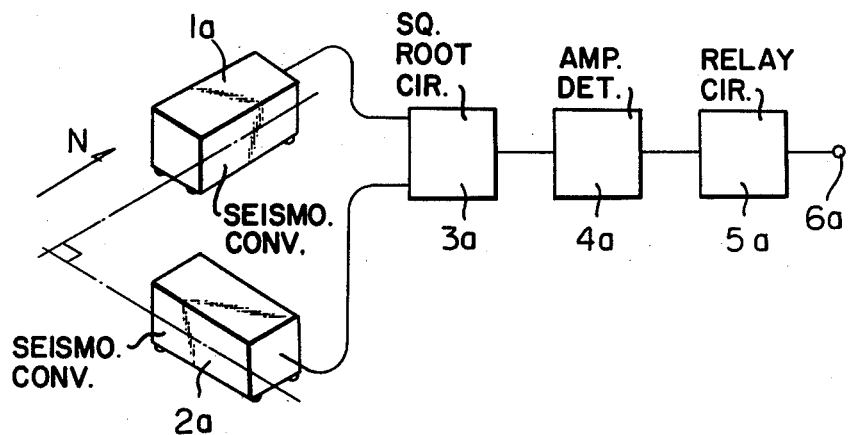
FIG. 1 shows the block-diagram of the prior vibration detector.
Figure 2:
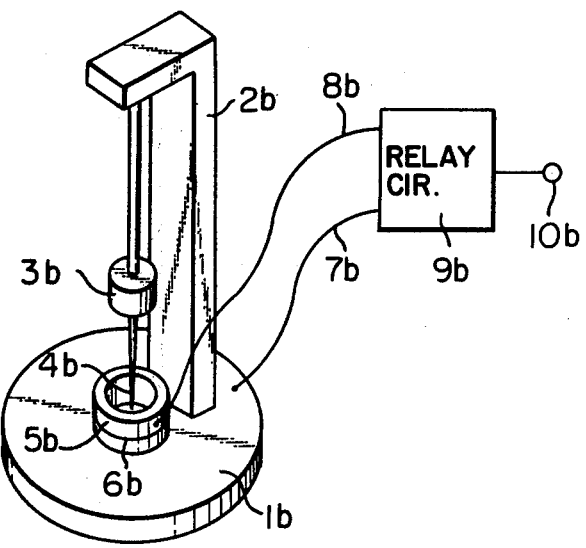
FIG. 2 shows the structure of another prior vibration detector.
Figure 3A:
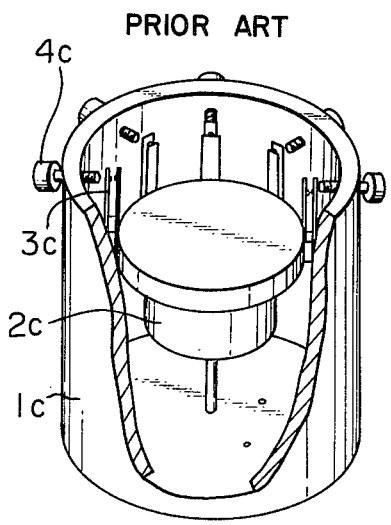
FIG. 3(A) shows the structure of another prior vibration detector.
Figure 3B:
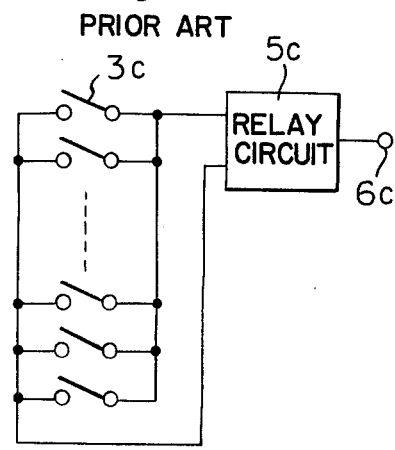
FIG. 3(B) is the circuit diagram of the vibration detector in FIG. 3(A)
Figure 4A:
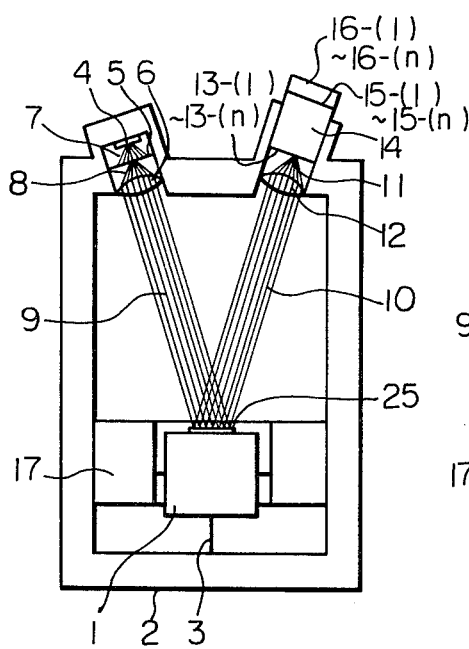
FIGS. 4(A) and 4(B) are side views of an example of a vibration detector in accordance with the invention.
Figure 4B:
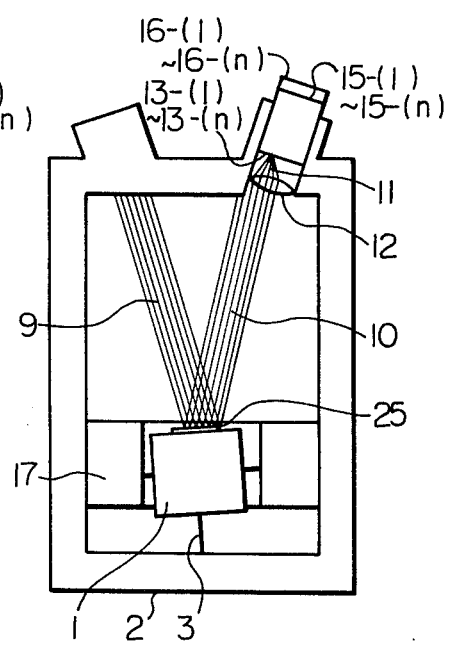

FIGS. 4(A) and 4(B) show the embodiment of the vibration detector in accordance with the invention. FIG. 4(A) shows the pivotally mounted mass in an undeflected position and FIG. 4(B) shows the mass in a deflected position as it vibrates. The mass acts like an inverted pendulum and is hereinafter referred to as such. The reference numeral 1 indicates the bob of the inverted pendulum, 2 is a housing, 3 is a supporting spring of the pendulum, 4 is a light source, 5 is a circular opening for the light beam provided in a diaphragm, 6 is a condenser lens, 7 to 11 are parts of the light beam from the source 4, 12 is a lens, 13-(1) to 13-(n) are portions of a light-receiving plane, 14 is an optical fiber bundle, 15-(1) to 15-(n) are fibers distributed across the cross-section of the fiber bundle, 16-(1) to 16-(n) are cells of a beam sensor, 17 is a damping means, and 25 is the mirror provided on the pendulum.

In the stationary condition, the pendulum 1 is supported vertically by the spring 3 as shown in FIG. 4(A). The light beam 7 from the light source 4 passes through the circular opening 5, and the light beam 8 which is the output of the opening 5 is applied to the lens 6. The light beam 9 from the lens 6 is an almost parallel beam which is directed to the mirror 25 on the pendulum 1. The mirror 25 reflects the light beam, and the reflected light beam 10 goes through the lens 12 to the light-receiving plane 13-(1) to 13-(n). The light beam 11 from the lens 12 focuses on the light-receiving plane 13-(1) to 13-(n), thus, the image of the circular opening 5 is provided on the light-receiving plane. In the stationary condition, the pendulum stands vertically, and the light beam 9 illuminates the center of the light receiving plane 13-(1) through 13-(n).

When there is an earthquake or any other vibration, a relative movement occurs between the pendulum 1 and the housing 2 according to the horizontal components of the vibration. As the damping means 17 is provided to damp the movement of the pendulum, the movement of the pendulum 1 reflects accurately the movement of the earth. Further, the damping means 17 limits the amplitude of the vibration of the pendulum. When the pendulum is vibrating as shown in FIG. 4(B), the light beam 9 illuminates the side portion of the mirror 25, and accordingly the light beam 10 or 11 illuminates the side portions of the light-receiving plane 13-(1) to 13-(n) instead of the center portion of the same. The optical condition on the light-receiving plane is tramsmitted to the cells of the beam sensor 16-(1) through 16-(n), through the optical fiber 14. One end of the optical fiber 14 composes the light-receiving plane and the other end of the optical fiber 14 is the cross section 15-(1) through 15-(n), to which the cells of the beam sensor 16-(1) through 16-(n) are optically connected.

The cells of the beam sensor are photo-electric convertors which generate an electric output signal according to the illumination on the cell. Some embodiments of the cell are photo-transistor, photo-diode, and some semi-conductors like CdS. It should be appreciated that the pendulum incorporates no electrical device and therefore has no lead wires. Further, the pendulum incorporates no optical device except for the mirror. Accordingly, the structure of the pendulum is quite simplified, and the pendulum can deflect freely and smoothly according to the vibration of the earth. It should be noted that both the light source and the light receiving plane are fixed on the housing instead of being fixed on the pendulum. Therfore stable operation of the light source and light receiving plane can be achieved and the limitations for the optical devices are reduced.

It should be further appreciated that the deflection angle of the beam 10 is twice of that of the beam 9, since the beam is reflected by the mirror 25. Thus, the mirror 25 amplifies the amplitude of the vibration. Accordingly, the sensitivity of the present invention is considerably improved.

Figures 5A, 5B, 5C:
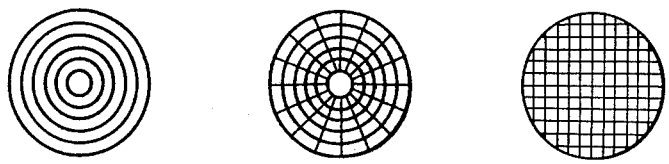
FIGS. 5(A), 5(B) and 5(C) show some embodiments of the arrangement of the cells of the beam sensor in the examples of the vibration detector in accordance with the invention.

FIG. 5(A), FIG. 5(B) and FIG. 5(C) show some embodiments of the arrangement of the cells of the sensor. In FIG. 5(A), the light receiving plane 13-(1) through 13-(n) are divided into a plurality of annular rings and the center circle by a plurality of concentric circles. The center circle 13-(1), the first annular ring 13-(2), and the most outer ring 13-(n) confront the cells 16-(1), 16-(2) and 16-(n), through the cross sections 15-(1), 15-(2), through 15-(n) of the optical fiber 14. Accordingly, in the stationary condition, the light beam 9 illuminates the center 13-(1) of the light receiving plane of the optical fiber 14, and said light beam illuminates the cell 16-(1) of the sensor through the cross section 15-(1). When a vibration deflects the light beams 9, 10, and 11 said light beam 11 illuminates one of the concentric annular rings 13-(2) through 13-(n), and then, one of the cells 16-(2) through 16-(n) is illuminated. It should be appreciated that the center circle 13-(1) and the annular rings 13-(2) through 13-(n) are symmetrical in relation to the center of the light receiving plane, and any direction of vibration in the horizontal plane deflects the light beam 9 to one of rings 13-(2) through 13-(n).

FIG. 5(B) shows another arrangement of the cells in which the light receiving plane is divided by both the concentric circles and a plurality of radial lines.

FIG. 5(C) is still another arrangement of the cells in which the light receiving plane is divided by a plurality of perpendicular cross lines. It should be noted that using the arrangement of FIG. 5(B) and/or FIG. 5(C), not only the intensity of the vibration but also the direction of the same can be measured.

Figure 6:
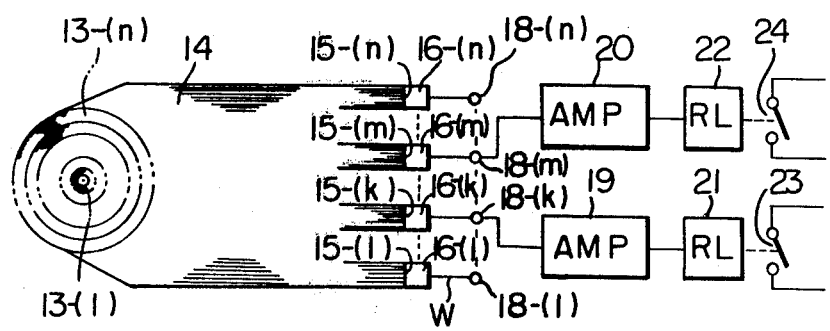
FIG. 6 is a circuit diagram of the electrical circuitry for use with the example of the vibration detector in accordance with the invention.

FIG. 6 shows the electrical circuit for use with the present vibration detector. The outputs of the cells of the sensor (16-(1) through 16-(n)) are provided to the terminals 18-(1) through 18-(n), through the wire W. FIG. 6 is the embodiment that two threshould levels are set for detecting the vibration. In FIG. 6, the terminal 18-(k) is connected to the amplifier 19, and the terminal 18-(m) is connected to the amplifier 20. It should be appreciated that any other terminals can be connected to other amplifiers to provide more threshould levels. When a vibration, the intensity of which is sufficient to provide an electrical signal at the terminal 18-(k) occurs, said electrical signal is applied to the relay 21 through the amplifier 19, thus the contact 23 of the relay 21 is closed and a vibration larger than the first threshold level is indicated. Further, when a vibration, the intensity of which is sufficient to provide an electrical signal at the terminal 18-(m) occurs, the electrical signal is applied to the relay 22 through the amplifier 20, thus the contact 24 of the relay 22 is closed, and a vibration larger than the second threshould level is indicated.

The light source 4 in FIG. 4(A) and FIG. 4(B) can be for instance a tungsten filament lamp, an LED (light emitting diode) or a laser. When the light source is an LED or a laser, the sensor (16-(1) through 16-(n) must be an photoelectric convertor in which the most sensivive spectrum coincides with that of the light source.

It should be appreciated that although the inverted pendulum is shown in the embodiment, a suspended pendulum is also useable in the present invention.

Figure 7A:
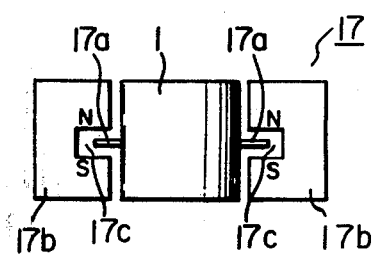
FIGS. 7(A) and 7(B) are side and plan views respectively of a damping means forming part of the examples of the vibration detector.
Figure 7B:
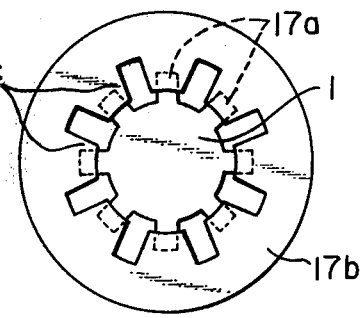

FIGS. 7(A) and FIG. 7(B) show the structure of the damping means 17. In the figures, the reference numeral 1 is the pendulum, 17a is the conductive plate connected to the pendulum 17, 17b is the yoke of a magnet, 17c is a gap between a pair of magnetic poles (N and S). When the pendulum is in the stationary condition, the conductive plate 17 stands at the center of the gap 17c. However, when the pendulum 1 vibrates the conductive plate 17a moves in the gap 17c where the magnetic field is present. Therefore, the movement of the conductive plate 17a causes the generation of eddy currents in the ring 17. Since the eddy currents consume the energy of the vibration of the pendulum, the movement of the pendulum is damped or braked.

It should be appreciated that any other damping means is possible to those skilled in the art. For instance, the pendulum can be submerged in oil for damping purposes.

As described above, the vibration detector of this invention is capable of detecting whether the composite value of two components in the composite vibration has reached the set point or not. Thus, a single detector performs functions which two sets of conventional type detectors perform.

Because detection is performed optically, the set point may be readily altered and in addition, multiple set points can be established. This device may be used as a vibration detector merely for detecting whether horizontal maximum acceleration of an earthquake movement has reached the set point or not. Furthermore, it may be used as an inclinometer to detect whether the inclination of the platform on which the vibration detector is installed has reached the set point or not.

From the foregoing it will now be apparent that a new and improved vibration detector has been found. It should be understood of course that the embodiments disclosed are merely illustrative and are not intended to limit the scope of the invention. Reference should be made to the appended claims, therefore, rather than the specification as indicating the scope of the invention.

Finally, the major reference numerals referred to in the specification are listed below.

| | |
|---|---|
| 1a, 2a seismograph convertor, | 3a square root circuit, |
| 4a amplitude detector, | 5a relay circuit, |

-continued

| | |
|---|---|
| 6a relay output, | 1b platform, |
| 2b fulcrum, | 3b pendulum, |
| 4b movable electrode, | 5b fixed electrode, |
| 6b insulation seat, | 7b, 8b cable, |
| 9b relay circuit, | 10b relay output, |
| 1c housing, | 2c pendulum, |
| 3c contact, | |
| 4c set point adjustable screw, | |
| 5c relay circuit, | 6c relay output, |
| 1 bob of the inverted pendulum, | |
| 2 housing, | |
| 3 supporting spring of the pendulum, | |
| 4 light source, | 5 circular opening, |
| 6 lens, | 7, 8, 9, 10, 11 light beam, |
| 12 lens, | |
| 13-(1) 13-(n) light receiving plane, | |
| 14 optical fiber, | |
| 15-(1) 15-(n) cross section of an optical fiber, | |
| 16 sensor, | |
| 16-(1) 16-(n) cell of beam sensor, | |
| 17 damping means, | 18-(1) 18-(n) terminal, |
| 19, 20 amplifier, | 21, 22 relay, |
| 23, 24 relay contact, | 25 mirror. |

What is claimed is:

1. A vibration detector comprising a stationary housing, a mass pivotally mounted in the housing so that it can deflect in an oscillatory manner from a vertical datum position upon the application of vibration to the housing, and returns to the datum position after cessation of the application of vibration, an optical mirror fixed horizontally on the top of the mass, a light source mounted on the stationary housing, a light beam receiving plane optically connected to a plurality of cells mounted on the stationary housing, a first optical means for directing the light beam from the light source onto the mirror, a second optical means for focusing the light beam reflected by the mirror from the light source on to said light beam receiving plane and each of said cells being arranged to provide an electrical signal according to the cell that the light beam illuminates depending upon the deflection of the mass.

2. A vibration detector according to claim 1, further comprising an optical fiber bundle between the light beam receiving plane and a plurality of fiber groups for guiding the light beam from the light receiving plane to the cells.

3. A vibration detector according to claim 2, wherein the bundle of optical fibers is divided into a plurality of sections comprising a centre circle and a plurality of concentric circular rings around the centre circle, and each section is arranged to illuminate a separate cell of the beam sensor.

4. A vibration detector according to claim 2, wherein the bundle of optical fibers is divided into a plurality of sections comprising a centre circle and a plurality of circular arcs concentric with the centre circle, and each section is arranged to illuminate a separate cell of the beam sensor.

5. A vibration detector according to claim 2, wherein the bundle of optical fibers is divided into a plurality of sections by mutually perpendicular lines across its cross-section and each section is arranged to illuminate a separate cell of the beam sensor.

* * * * *